(12) United States Patent
Srivastava

(10) Patent No.: US 9,600,251 B1
(45) Date of Patent: Mar. 21, 2017

(54) ENHANCING API SERVICE SCHEMES

(71) Applicant: Google Inc., Mountain View, CA (US)

(72) Inventor: Kumar Srivastava, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1 day.

(21) Appl. No.: 14/512,954

(22) Filed: Oct. 13, 2014

(51) Int. Cl.
*G06F 9/54* (2006.01)
*G06F 9/45* (2006.01)
*G06F 9/48* (2006.01)
*G06F 11/36* (2006.01)

(52) U.S. Cl.
CPC ............ *G06F 8/443* (2013.01); *G06F 9/48* (2013.01); *G06F 9/542* (2013.01); *G06F 11/3612* (2013.01)

(58) Field of Classification Search
None
See application file for complete search history.

(56) References Cited

U.S. PATENT DOCUMENTS

| | | | |
|---|---|---|---|
| 6,519,452 B1* | 2/2003 | Agostino et al. | 455/423 |
| 2003/0105833 A1* | 6/2003 | Daniels | H04L 29/06 709/219 |
| 2007/0074215 A1* | 3/2007 | Bethea | H04L 67/02 718/101 |
| 2008/0183902 A1* | 7/2008 | Cooper et al. | 709/250 |
| 2009/0013078 A1* | 1/2009 | Bencheikh | 709/227 |
| 2009/0292791 A1* | 11/2009 | Livshits | G06F 9/4443 709/217 |
| 2010/0138671 A1* | 6/2010 | Kim | G06F 21/10 713/189 |
| 2010/0232431 A1* | 9/2010 | Sebastian | 370/390 |
| 2012/0259821 A1* | 10/2012 | Alam | 707/692 |
| 2013/0227078 A1* | 8/2013 | Wei et al. | 709/219 |
| 2014/0047071 A1* | 2/2014 | Shehada et al. | 709/219 |
| 2014/0282777 A1* | 9/2014 | Gonder et al. | 725/109 |
| 2015/0146722 A1* | 5/2015 | Wainner | 370/392 |

OTHER PUBLICATIONS

MSFT, "Message Queuing Performance Monitoring", Jun. 25, 2007, pp. 1-2.*
U.S. Appl. No. 14/170,656, filed Feb. 3, 2014.
U.S. Appl. No. 14/170,657, filed Feb. 3, 2014.

* cited by examiner

*Primary Examiner* — Timothy A Mudrick
*Assistant Examiner* — Phuong N Hoang
(74) *Attorney, Agent, or Firm* — Fish & Richardson P.C.

(57) ABSTRACT

Embodiments of enhancing API servicing schemes are disclosed. A set of proxy code associated with servicing the API requests of an application is analyzed during development time to determine if any portion can be modified to improve the service scheme, prior to executing the set of proxy code in a runtime. After the set of proxy code is deployed in a runtime environment, performance data associated with the current service scheme is collected and periodically used to determine whether the service scheme for the API requests of the application is to be updated.

36 Claims, 12 Drawing Sheets

ENHANCING API SERVICE SCHEMES

BACKGROUND OF THE INVENTION

To expose data stored at a backend server to a customer in a convenient manner, an API platform can be used to receive an Application Programming Interface (API) request from an application executing on a device and forward the request to the backend server. The requested data can be returned by the backend server to the proxy server, which will pass the requested data back to the application.

Increasingly, API platforms are used more for orchestrating complex workflows that involve not just a single endpoint (e.g., a backend server) but also multiple services that are consumed in a certain flow and order to generate the final response for the customer for which data is requested using the application.

BRIEF DESCRIPTION OF THE DRAWINGS

Various embodiments of the invention are disclosed in the following detailed description and the accompanying drawings.

DETAILED DESCRIPTION

Figure 1:
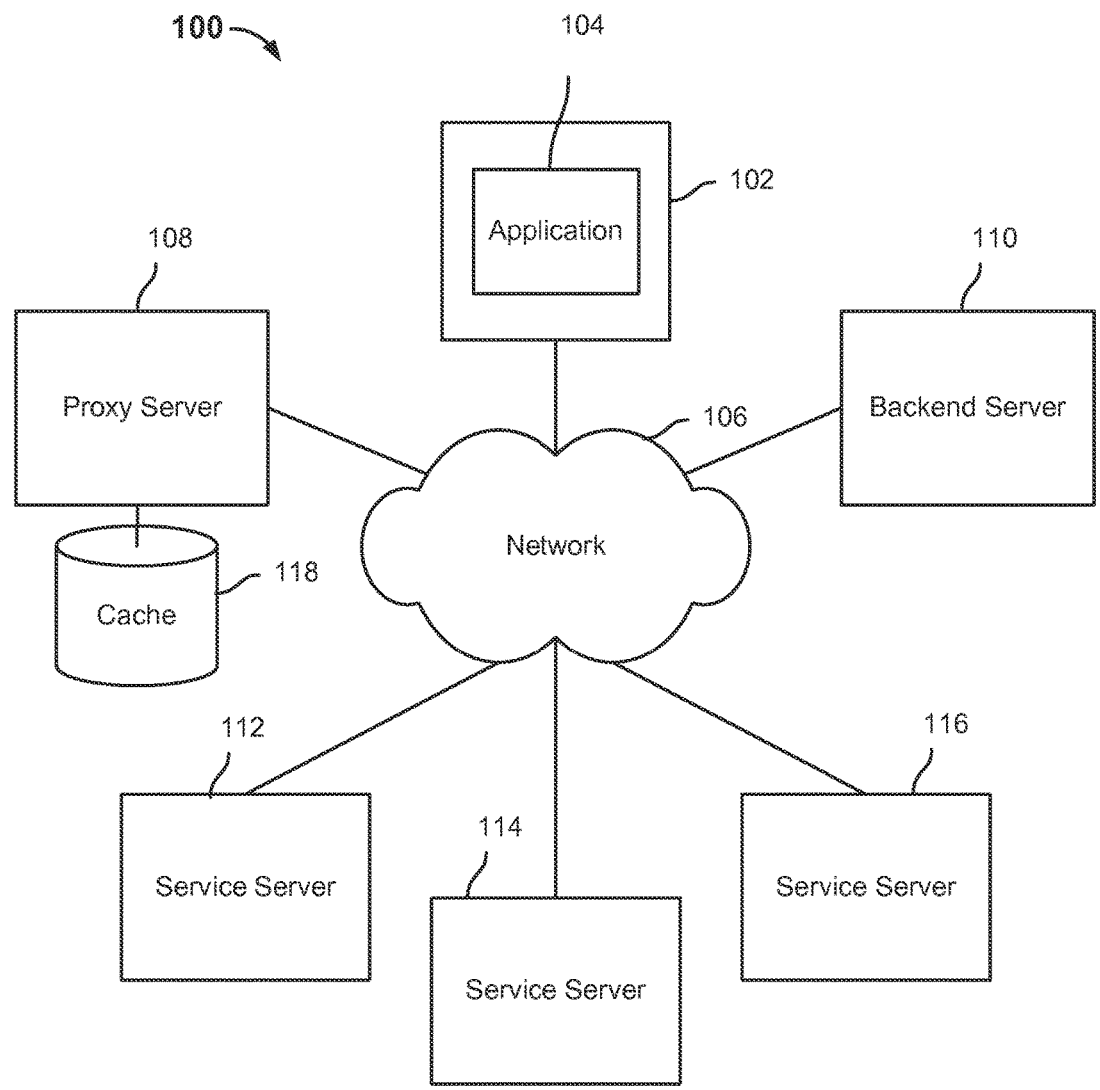
FIG. 1 is a diagram showing an embodiment of a system for enhancing API service schemes.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of enhancing Application Interface Programming (API) service schemes are described herein. In various embodiments, an API request generated by an application executing at a device is received at a proxy server. The proxy server comprises an API platform that determines how to obtain the data required by the API request based at least in part on a set of proxy code associated with the application that sent the API request. In some embodiments, the "set of proxy code" comprises computer program code and/or other logic that dictates at least which service callouts that the proxy server is configured to generate and a sequence in which to perform at least a portion of the service callouts in response to a received API request associated with an application at runtime. The set of proxy code is to be executed at runtime to service API requests associated with the application. The data obtained by the service callouts from their respective target services are used to generate a response to the API request. In various embodiments, a "service callout" comprises a service request generated by the proxy server at runtime in response to a received API request for data stored by a particular target service. Often, responding to an API request requires requesting data from each of multiple services to form a successful response to the API request. As such, the proxy server commonly generates multiple service callouts in response to each API request received at runtime. In various embodiments, an initial set of proxy code is submitted by a developer of the application. As will be described in further detail below, in some embodiments, the initial set of proxy code submitted for an application may be analyzed and modified at development time (e.g., prior to runtime) to improve the manner in which the service callouts will be performed for an API request associated with that application at runtime. In various embodiments, "development time" refers to a period of time prior to executing a set of proxy code. In various embodiments, "runtime" refers to the period of time in which the set of proxy code is executed. Development time refers to the period of time during which a set of proxy code is created or built. At development time, the set of proxy code is not yet used to handle API requests. After the set of proxy code has been created or written, the set of proxy code is ready to be deployed in a runtime environment. Once the set of proxy code has been deployed to the runtime environment, the set of proxy code is now ready to start serving incoming API calls. "Runtime" refers to the usage of the proxy code to serve API requests. At runtime, an incoming API request is serviced by execution of the set of proxy code that is deployed in the runtime environment. Furthermore, in some embodiments, the manner in which the service callouts are performed for API requests associated with an application can be improved at runtime based on, for example, performance data collected for previously serviced API requests.

FIG. 1 is a diagram showing an embodiment of a system for enhancing API service schemes. In the example, system 100 includes device 102, network 106, proxy server 108, cache 118, backend server 110, service server 112, service server 114, and service server 116. Network 106 may comprise high-speed data networks and/or telecommunications networks.

Application 104 is executing on device 102. Examples of device 102 may include a desktop computer, a laptop computer, a mobile device, a smart phone, a tablet device, and any other type of computing device. Based on a user's interaction (e.g., selection(s), input(s)) with application 104, application 104 is configured to generate an API request to access desired data. The API request is sent over network 106 to proxy server 108. Proxy server 108 comprises an API management server that receives API requests from applications and retrieves the data required to respond to each API request by sending requests to one or more of backend server 110 and service servers 112, 114, and 116. Backend server 110 may comprise a server that stores data associated with the application. Backend server 110 comprises a collection of services and systems behind an API proxy, such as proxy server 108. The API proxy serves as front for the backend systems and handles incoming API requests, processes them before sending the requests to the backend server for further processing. Similarly, backend systems respond to API requests sent by the API proxy with responses. These responses are sent to the API proxy, which in turn, sends the responses to the requesting application. For example, application 104 may have been developed by a party that is associated with the party that operates backend server 110.

In various embodiments, a request for data generated and sent by proxy server 108 to a server associated with a service (e.g., such as service server 112, 114, and 116) in response to a received API request is referred to as a "service callout." In some embodiments, a request for data generated and sent by proxy server 108 to backend server 110 is not referred to as a service callout. Proxy server 108 sends a service callout to a particular service server to retrieve data specific to the server associated with the server. For example, a service server may comprise a third party service and/or a service provided by the same party that operates backend server 110. For example, a service server may be associated with a social network platform, a weather forecast service, and a cloud storage. Proxy server 108 is configured to cache data obtained from backend sever 110 and/or one or more of service servers 112, 114, and 116 in cache 118 based on default caching policies (e.g., retention periods), parameters configured by proxy server 108, and/or configurations submitted by an application developer associated with an application.

Proxy server 108 determines the manner in which the service callouts generated for a received API request are to be sent to their respective target services based at least in part on a set of proxy code that is associated with the application that sent the API request. In various embodiments, a set of proxy code is configured to indicate to which one or more services service callouts are to be made, the sequence in which to execute the service callouts, caching policies associated with data obtained for the API request received at runtime, and/or how the data obtained from each service is to be used in generating the response to the API request. In various embodiments, an application developer associated with each application configures an initial set of proxy code to be used to generate and send service callouts for API requests associated with that application. In various embodiments, if any service callout generated for an API request fails to obtain data (e.g., because the service that it contacts has failed and/or is non-responsive), then the entire API request fails, and a failed response is sent to application 104 that was associated with sending the API request.

Conventionally, the manner in which proxy server 108 generates and sends service callouts in response to a received API request remains static. As such, any inefficiencies associated with the way that service callouts are handled for an API request associated with each application remain unchanged over time unless the application developer manually modifies a set of proxy code associated with the application.

Embodiments of improving the API service schemes are described herein. In various embodiments, a "service scheme" refers to the manner in which service callouts are sent to services for an API request and/or the manner in which the data obtained from the services are cached. In some embodiments, a service scheme for an API request is determined at least in part by the set of proxy code that is stored for the application associated with the API request. In some embodiments, as will be described in further detail below, proxy server 108 is configured to analyze an initial set of proxy code submitted by an application developer for handling API requests from the application, prior to runtime, to determine whether the initial proxy code should be modified to improve in the manner in which the service scheme will service API requests at runtime. For example, proxy server 108 may suggest performing modifications to the initial set of proxy code at development time, which precedes executing the proxy code at runtime to service actual API requests.

In some embodiments, as will be described in further detail below, proxy server 108 is configured to determine whether the service scheme that has been used to service API requests associated with an application should be improved at runtime. For example, proxy server 108 may collect performance data associated with historically handled API requests at runtime and periodically suggest modifications to the service scheme by altering the sequence/volume that service callouts are sent to their respective services and/or by changing the caching policies associated with data stored at cache 118.

Figure 2:
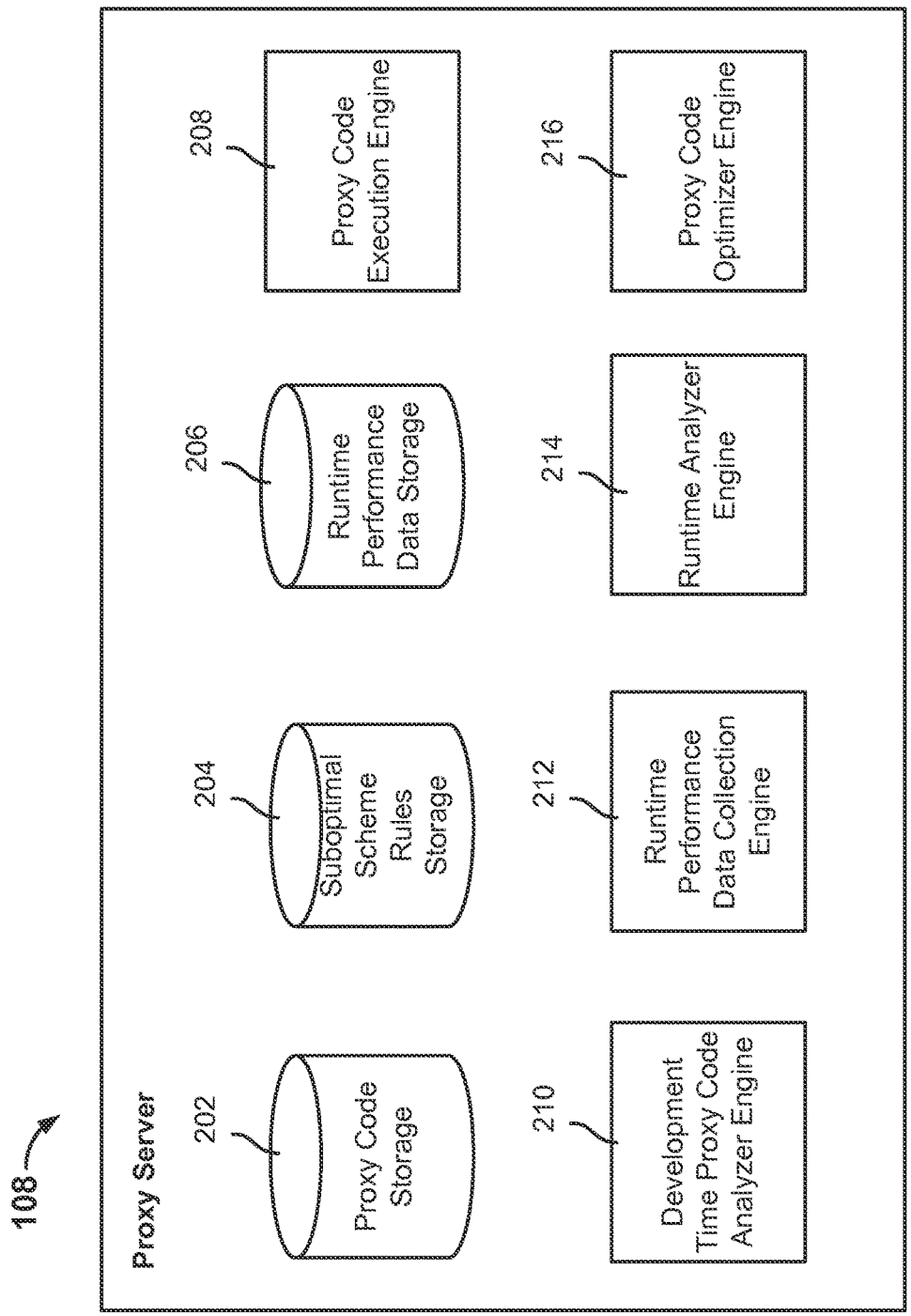
FIG. 2 is a diagram showing an example of a proxy server.

FIG. 2 is a diagram showing an example of a proxy server. In some embodiments, proxy server 108 of system 100 of FIG. 1 can be implemented using the example of FIG. 2. In the example of FIG. 2, the proxy server includes proxy code storage 202, suboptimal scheme rules storage 204, runtime performance data storage 206, proxy code execution engine 208, development time proxy code analyzer engine 210, runtime performance data collection engine 212, runtime analyzer engine 214, and proxy code optimizer engine 216. Each of proxy code execution engine 208, development time proxy code analyzer engine 210, runtime performance data collection engine 212, runtime analyzer engine 214, and proxy code optimizer engine 216 may be implemented using one or both of hardware and software. In some embodiments, the proxy server also manages a cache storage (not shown).

Proxy code storage 202 is configured to receive sets of proxy code. A set of proxy code is associated with a particular application and is configured to be executed at runtime to use to respond to API requests from the application. In some embodiments, the set of proxy code corresponding to an application is configured to be used by the proxy server to determine, for a received API request from the application, which data is to be requested using a service callout from which services, the sequence in which to send the service callouts, caching policies associated with data obtained for the API request (e.g., the caching policies indicate which data from which service is to be cached and if so, for how long), and/or how the data obtained from each service is to be used in generating the response to the API request. In some embodiments, an initial set of proxy code is submitted for an application by a developer of that application at development time (prior to runtime).

As will be described in further detail below, in some embodiments, at development time (prior to runtime), the initial set of proxy code submitted by the developer of that application may be analyzed (e.g., by development time proxy code analyzer engine 210) to determine whether any portion of the initial set of proxy code should be modified to improve the service scheme that will be used to service API requests at runtime. If the initial set of proxy code is analyzed at development time and is determined to be modified, the set of proxy code is updated (e.g., by proxy code optimizer engine 216) and then stored at proxy code storage 202 to be executed at runtime. In some embodiments, proxy code optimizer engine 216 is configured to automatically generate proxy code and/or update existing proxy code. Furthermore, as will be described in further detail below, in some embodiments, at runtime when the set of proxy code stored for an application at proxy code storage 202 is executed (e.g., by proxy code execution engine 208) to handle API requests from the application, the performance data associated with handled API requests is stored (e.g., at runtime performance data storage 206) from the application and is analyzed (e.g., by runtime analyzer engine 214) to determine whether the service scheme in which service callouts have been handled at runtime can be improved. If the performance data associated with handling previous API requests is analyzed at runtime and the service scheme in which service callouts have been handled at runtime is determined to be modified, in some embodiments, the set of proxy code is updated (e.g., by proxy code optimizer engine 216) and then stored at proxy code storage 202 to be executed at runtime in place of the previous version of the set of proxy code.

Suboptimal scheme rules storage 204 is configured to store rules to be used to determine whether the initial set of proxy code submitted at development time for an application is suboptimal and should therefore be improved. Suboptimal scheme rules storage 204 is also configured to store rules to be used to determine whether the service scheme that had been used to handle service callouts for API requests associated with an application at runtime is suboptimal and should therefore be improved. For example, a rule may include a condition/criterion that describes at least an aspect/property of an initial set of proxy code that is suboptimal and also a prescribed modification to the initial set of proxy code that improves the service scheme. An example of such a rule indicates that if a portion of the initial set of proxy code describes making multiple service callouts for the same set of data (e.g., that is very unlikely to change in between the times that the redundant service callouts are to be made), then the portion of the initial set of proxy code can be modified to remove all but one of the redundant service callouts. In another example, a rule may include a condition/criterion that describes at least an aspect of the service scheme for handling API requests associated with an application that is a suboptimal and also a prescribed action that improves the service scheme. An example of such a rule indicates that if a particular service is determined to historically fail at a high rate, then the execution of the service callout that targets the service should be modified such that the service callout is scheduled to be sent out as early as possible in response to an API request to determine as soon as possible whether that service has failed and therefore, the API request has failed.

Development time proxy code analyzer engine 210 is configured to analyze an initial set of proxy code that is submitted by an application developer for an application at development time to determine whether any portion of the initial set of proxy code is suboptimal and therefore should be modified to improve the service scheme that will be provided by the set of proxy code at runtime. In various embodiments, development time proxy code analyzer engine 210 uses the rules stored at suboptimal scheme rules storage 204 to determine whether any portion of the initial set of proxy code is suboptimal and therefore should be modified. In various embodiments, in the event that development time proxy code analyzer engine 210 determines that a portion of the initial set of proxy code is suboptimal and therefore should be modified, proxy code optimizer engine 216 is configured to suggest modifications to the initial set of proxy code (e.g., also based on rules stored at suboptimal scheme rules storage 204). In some embodiments, prior to proxy code optimizer engine 216 applying the suggested modifications to the initial set of proxy code, proxy code optimizer engine 216 is configured to notify the application developer of the suggested modifications (e.g., via email and/or other form of electronic notification). The modifications to the initial set of proxy code are not made unless an approval (e.g., via a user input/selection through an email and/or at a user interface) is received from the application developer. The modified or unmodified set of proxy code is stored at proxy code storage 202, to be executed at runtime to handle API requests received from the associated application.

Proxy code execution engine 208 is configured to execute one or more sets of proxy code stored at proxy code storage 202 at runtime. An executing set of proxy code associated with an application is used to implement the service scheme needed to be performed for an API request received from that application.

Runtime performance data collection engine 212 is configured to collect data associated with API requests received at runtime. In some embodiments, runtime performance data collection engine 212 is configured to collect data, at runtime, associated with each received API request associated with each application and the result of using the associated service callouts associated with each API request to obtain data from a respective server. The collected performance data is stored at runtime performance data storage 206. In various embodiments, with respect to each API request, runtime performance data collection engine 212 is configured to collect data, at runtime, associated with one or more of the following: the requestor (e.g., the type of device, the application), the time of day at which the API request was sent, the properties of the requested data (e.g., the target uniform resource locator (URL)) from each target service, the time in which a response was received from each target service, whether an error occurred and/or what type of error was received from a target service, and the current performance of each target service (e.g., the current CPU utilization of the service, the current memory utilization of the service, the current I/O utilization of the service).

Runtime analyzer engine 214 is configured to use the performance data stored at runtime performance data storage 206 to determine, at runtime, whether the current service scheme associated with handling API requests associated with a particular application is suboptimal and therefore should be modified to improve the service scheme to be provided to subsequently received API requests. In some embodiments, runtime analyzer engine 214 is configured to periodically analyze a subset of the performance data associated with a most recent window of time (e.g., of a user configured length) stored at runtime performance data storage 206 associated with API requests from each application to determine whether the current service scheme associated with handling API requests associated with that application is suboptimal and therefore should be modified for subsequently received API requests from that application. In some embodiments, runtime analyzer engine 214 uses rules stored at suboptimal scheme rules storage 204 to determine whether the currently executed set of proxy code associated with an application is suboptimal and/or other service callout related behavior implemented by the proxy server is suboptimal and therefore should be modified. In some embodiments, in the event that runtime analyzer engine 214 determines that the currently executed set of proxy code associated with an application is suboptimal and/or other service callout related behavior implemented by the proxy server is suboptimal and therefore should be modified, proxy code optimizer engine 216 is configured to suggest modifications to the currently executed set of proxy code (e.g., also based on rules stored at suboptimal scheme rules storage 204). In some embodiments, prior to proxy code optimizer engine 216 applying the suggested modifications to the currently executing set of proxy code, proxy code optimizer engine 216 is configured to notify the application developer of the suggested modifications (e.g., via email and/or other form of electronic notification). The modifications are not made unless an approval (e.g., via a user input/selection through an email and/or at a user interface) has been received from the application developer. The modified or unmodified set of proxy code is stored at proxy code storage 202 and to be executed (e.g., by proxy code execution engine) to handle subsequently received API requests from the associated application. In some embodiments, the suboptimal service scheme of the application at runtime can be modified in ways other than by modifying the currently executed set of proxy code associated with the application. For example, logic associated with the proxy server for handling that application can be modified such that the proxy server is configured to perform a different service scheme for the API requests associated with that application. As such, runtime performance data collection engine 212 is configured to continuously collect performance data associated with servicing API requests at runtime and runtime analyzer engine 214 is configured to periodically use at least a subset of the collected performance data associated with the serviced API requests of each application to dynamically improve the service scheme for subsequently received API requests at runtime.

Figure 3:
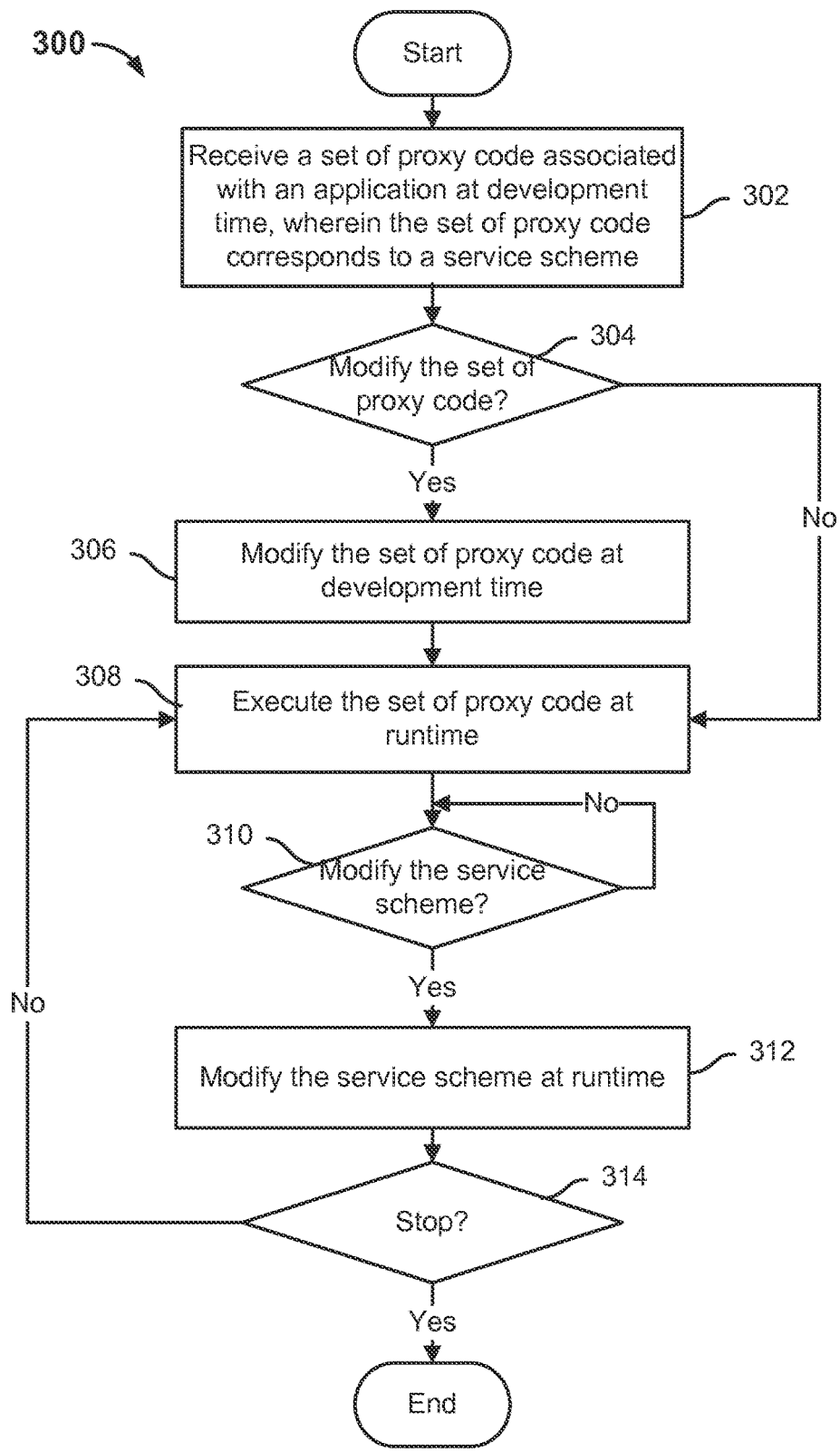
FIG. 3 is a flow diagram showing an embodiment of a process for enhancing API service schemes.

FIG. 3 is a flow diagram showing an embodiment of a process for enhancing API service schemes. In some embodiments, process 300 is implemented at system 100 of FIG. 1. Specifically, in some embodiments, process 300 is implemented at proxy server 108 of system 100 of FIG. 1.

Process 300 shows an example process in which a service scheme for accessing services associated with responding to an API request associated with an application can be modified/improved at development time and then repeatedly at runtime.

At 302, a set of proxy code associated with an application is received at development time, wherein the set of proxy code corresponds to a service scheme. In some embodiments, an initial set of proxy code associated with accessing services associated with responding to an API request associated with an application is received from the application developer. The initial set of proxy code describes an initial service scheme configured by the application developer.

At 304, it is determined whether the set of proxy code should be modified. In some embodiments, while at development time, the set of proxy code submitted by the application developer can be analyzed to determine whether any portion is suboptimal and therefore should be modified (e.g., using configured suboptimal scheme rules). In the event the set of proxy code is determined to be modified, control is transferred to 306. Otherwise, in the event that the set of proxy code is not determined to be modified, control is transferred to 308.

At 306, the set of proxy code is modified at development time. In some embodiments, the set of proxy code is modified based on the suboptimal scheme rules.

At 308, the set of proxy code is executed at runtime. After the set of proxy code is executed, performance data is collected over time associated with the servicing of API requests based on the current service scheme determined at least in part by the executed set of proxy code.

At 310, it is determined whether the service scheme should be modified. In some embodiments, at least some of the (e.g., most recently) stored performance data associated with the service scheme corresponding to the set of proxy code is used to determine whether the service scheme is suboptimal and therefore should be modified (e.g., using configured suboptimal scheme rules). In the event the service scheme is determined to be modified, control is transferred to 312. Otherwise, in the event that the service scheme is not determined to be modified, control is returned to 310 at a later time.

At 312, the service scheme is modified at runtime. In some embodiments, the service scheme is modified based at least in part on modifying the current set of proxy code based on the suboptimal scheme rules and executing the modified set of proxy code at runtime.

At 314, it is determined whether the process should be stopped. For example, process 300 may be stopped in the event that the proxy server is shut down. In the event the process is determined to be stopped, process 300 ends. Otherwise, in the event that the process is not determined to be stopped, control is returned to 308.

Figure 4:
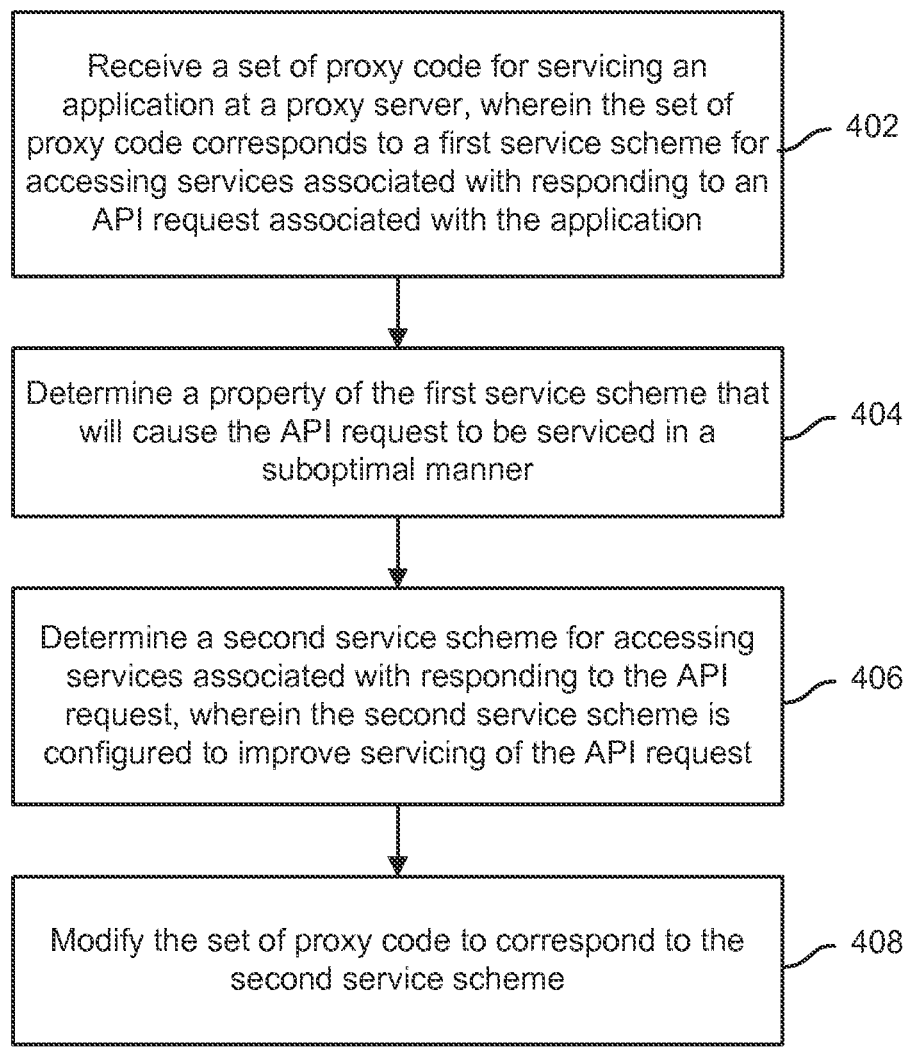
FIG. 4 is a flow diagram showing an embodiment of a process for enhancing API service schemes.

FIG. 4 is a flow diagram showing an embodiment of a process for enhancing API service schemes. In some embodiments, process 400 is implemented at system 100 of FIG. 1. Specifically, in some embodiments, process 400 is implemented at proxy server 108 of system 100 of FIG. 1. In some embodiments, steps 302, 304, and 306 of process 300 of FIG. 3 can be implemented at least in part using process 400.

Process 400 shows an example process in which a set of proxy code corresponding to a service scheme for accessing services associated with responding to an API request associated with an application can be modified/improved at development time, prior to executing the set of proxy code at runtime.

At 402, a set of proxy code for servicing an application is received at a proxy server, wherein the set of proxy code corresponds to a first service scheme for accessing services associated with responding to an API request associated with the application. A set of proxy code is received from the application developer, in some embodiments. The set of proxy code describes which service callouts will be generated and how they will be sent to their respective target services in response to an API request received from the associated application.

At 404, a property of the first service scheme that will cause the API request to be serviced in a suboptimal manner is determined. The set of proxy code is analyzed to determine whether a property of the service scheme will cause an API request to be serviced in a suboptimal manner based on configured suboptimal scheme rules.

At 406, a second service scheme for accessing services associated with responding to the API request is determined, wherein the second service scheme is configured to improve servicing of the API request. In response to the determination that the property of the service scheme will cause an API request to be serviced in a suboptimal manner, a new service scheme that corrects at least the suboptimal behavior and/or generally improves over the initial service scheme is determined. For example, the new service scheme will cause, at runtime, the (e.g., a successful or a failed) response to the API request to be determined faster, improve the successful response rate of a target service for a service callout, maintain data in a cache storage for longer during a predicted period of need, and/or eliminate unnecessary service callouts.

At 408, the set of proxy code is modified to correspond to the second service scheme. In some embodiments, the set of proxy code is modified such that it can be executed at runtime to cause the performance of the new service scheme. The modified set of proxy code is then executed at runtime (e.g., by the proxy server) to handle API requests received from the associated application.

Figure 5:
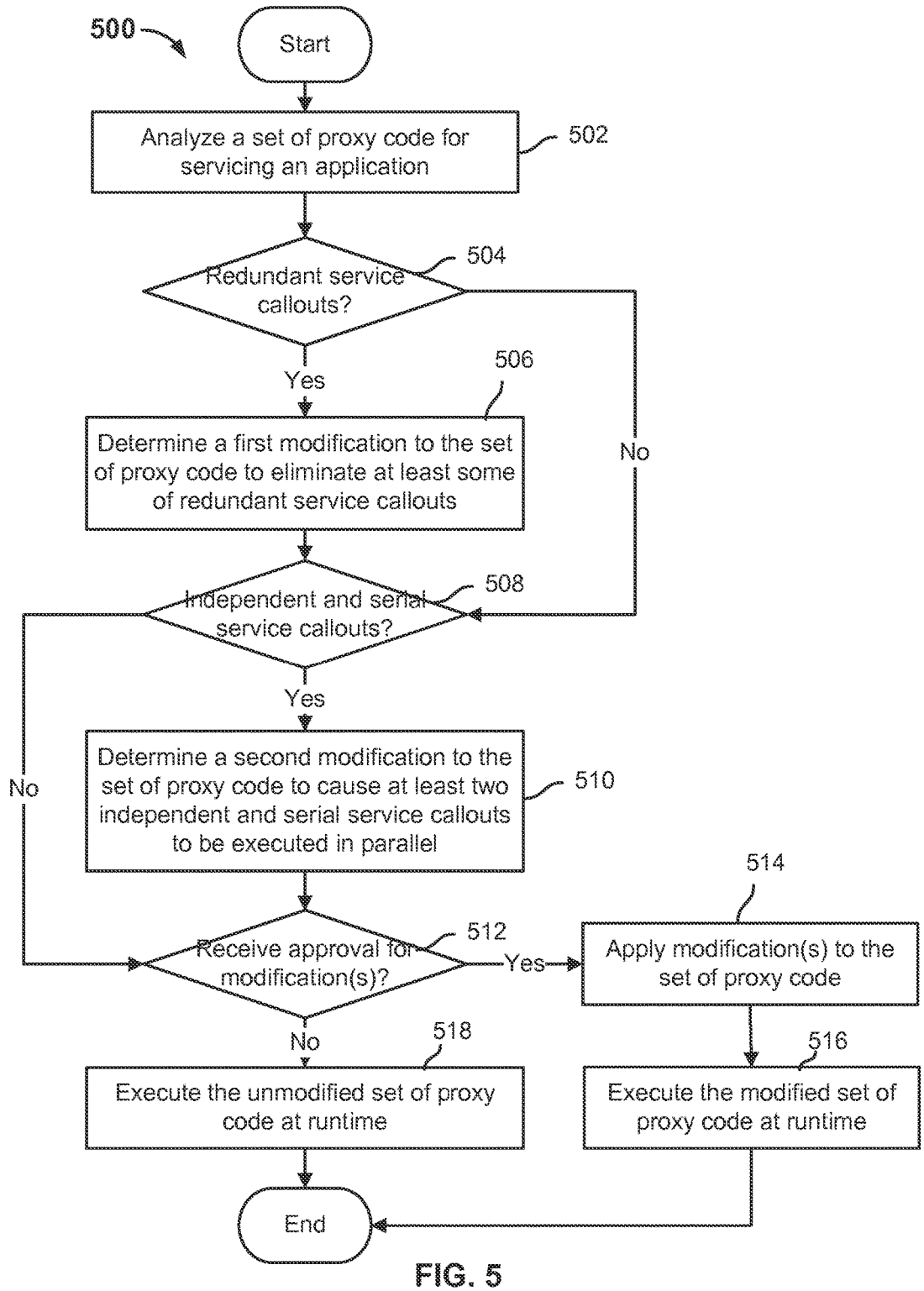
FIG. 5 is a flow diagram showing an embodiment of a process for enhancing API service schemes at development time.

FIG. 5 is a flow diagram showing an embodiment of a process for enhancing API service schemes at development time. In some embodiments, process 500 is implemented at system 100 of FIG. 1. Specifically, in some embodiments, process 500 is implemented at proxy server 108 of system 100 of FIG. 1. In some embodiments, process 400 of FIG. 4 can be implemented at least in part using process 500.

At 502, a set of proxy code for servicing an application is analyzed. In some embodiments, a set of proxy code is received from the application developer. The set of proxy code describes which service callouts will be generated and how they will be sent to their respective services in response to an API request received from the associated application. The set of proxy code is analyzed for any properties that would cause an API request to be serviced in a suboptimal manner when the set of proxy code is executed at runtime. In some embodiments, the analysis is performed based on suboptimal scheme rules.

At 504, it is determined whether there are any redundant service callouts to be made for an API request associated with the application. In a first example, a property that would cause an API request to be serviced in a suboptimal manner when the set of proxy code is executed at runtime is the presence of redundant service callouts (e.g., service callouts that obtain the same or substantially similar data) for a single API request. For example, the set of proxy code can describe generating two more service callouts for a single API request that obtain the same or substantially the same data from a target service. For example, the set of proxy code can describe sending two service callouts to obtain the weather forecast data associated with the same parameters (e.g., time period) for the same geographic area from a weather forecasting service and thus these service callouts are redundant. Possible reasons that the redundant service callouts were included in the set of proxy code include that the redundant service callouts were inadvertently used, that redundant service callouts were added to the set of proxy code over the course of multiple releases, that the set of proxy code was inefficiently written, and/or that the set of proxy code used reusable modules in an inefficient manner. In the event that there are at least two redundant service callouts to be made for the same API request, control is transferred to 506. Otherwise, in the event that there is not any redundant service callouts to be made for an API request, control is transferred to 508.

At 506, a first modification to the set of proxy code to eliminate at least some of the redundant service callouts is determined. In some embodiments, the property of describing redundant service callouts in the set of proxy code is a condition for a suboptimal manner of servicing an API request according to a suboptimal scheme rule. During the analysis of the set of proxy code, the presence of the redundant service callouts in the set of proxy code is determined to match that suboptimal scheme rule. In some embodiments, the matched suboptimal scheme rule may prescribe one or more modifications to the set of proxy code to correct for the suboptimal manner of serving an API request. In the example of the presence of the redundant service callouts in the set of proxy code, the matching suboptimal scheme rule can prescribe a modification to the set of proxy code to eliminate all but one of the redundant service callouts for servicing a single API request. As such, eliminating some redundant service callouts frees up resources that would have otherwise been assigned to retrieving the redundant data.

At 508, it is determined whether there are any independent and serial service callouts to be made for the API request associated with the application. In a second example, a property that would cause an API request to be serviced in a suboptimal manner when the set of proxy code is executed at runtime is when service callouts that are independent of each other are sent in a serial manner for an API request. A first service callout that is independent of a second service callout is a service callout whose manner of execution does not depend on the response of the second service callout. Serial service callouts are service callouts that are executed one after another. For example, the set of proxy code can describe generating two more service callouts, for an API request, that can be performed independent of each other but are yet described by the set of proxy code to be performed serially. In the event that there are independent and serial service callouts to be made for the same API request, control is transferred to 510. Otherwise, in the event that there is not any independent and serial service callout to be made for an API request, control is transferred to 512.

At 510, a second modification to the set of proxy code to cause at least two independent and serial service callouts to be executed in parallel is determined. In some embodiments, the property of describing independent and serial service callouts in the set of proxy code is a condition for a suboptimal manner of servicing an API request according to a suboptimal scheme rule. During the analysis of the set of proxy code, the presence of independent and serial service callouts in the set of proxy code is determined to match that suboptimal scheme rule. In some embodiments, the matched suboptimal scheme rule may prescribe one or more modifications to the set of proxy code to correct for the suboptimal manner of serving an API request. In the example of the presence of the independent and serial service callouts in the set of proxy code, the matching suboptimal scheme rule can prescribe a modification to the set of proxy code to cause the independent service callouts to be performed at least partially in parallel of each other for servicing a single API request. When independent service callouts are performed at least partially in parallel of each other, each of the service callouts can be sent to the target service without waiting for a response from a previously sent service callout. As such, sending independent service callouts at least partially in parallel improves the efficiency of accessing data from various services.

At 512, it is determined whether approval has been received from a developer associated with the application for the first and/or second modification. In some embodiments, prior to the first and/or second modification being applied to the set of proxy code, a notification describing the suggested modifications are first sent to the application developer. For example, an email and/or a message at a user interface describing the suggested modifications are first sent to the application developer. In response to the notification, the application developer can input a feedback that either approves or does not approve the application of the modifications. In the event that approval has been received, control is transferred to 514. Otherwise, in the event that approval has not been received, control is transferred to 518.

At 514, the modification(s) are applied to the set of proxy code. In the event that approval for the modification(s) has been received, either the first and/or second modification(s) that are relevant to the set of proxy code is applied.

At 516, the modified set of proxy code is executed at runtime. The modified set of proxy code is later executed to service API requests associated with the application at runtime.

At 518, the unmodified set of proxy code is executed at runtime. In the event that approval for the modification(s) has not been received, neither the first and/or second modification(s) that are relevant to the set of proxy code are applied and the unmodified set of proxy code is later executed to service API requests associated with the application at runtime.

Figure 6:
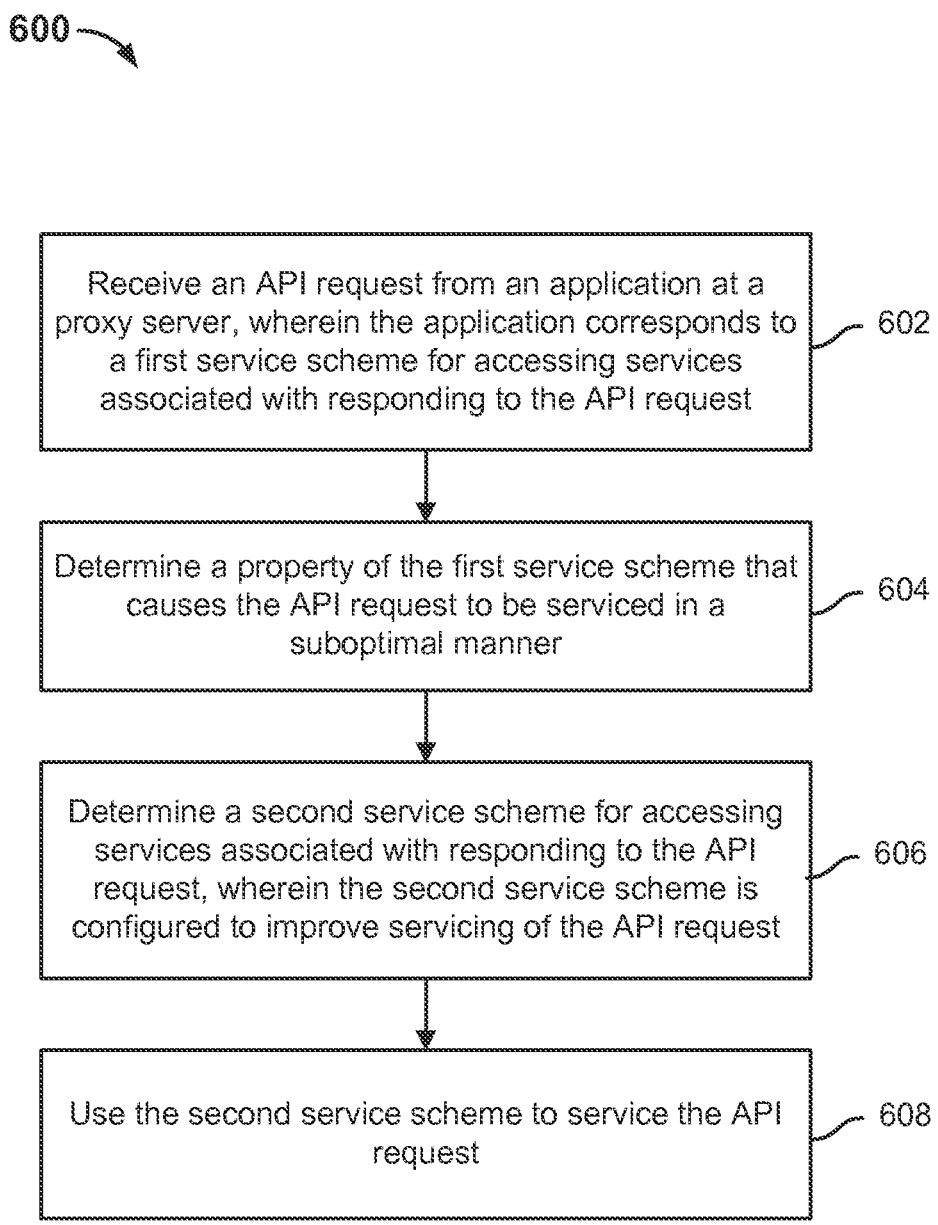
FIG. 6 is a flow diagram showing an embodiment of a process for enhancing API service schemes.

FIG. 6 is a flow diagram showing an embodiment of a process for enhancing API service schemes. In some embodiments, process 600 is implemented at system 100 of FIG. 1. Specifically, in some embodiments, process 600 is implemented at proxy server 108 of system 100 of FIG. 1. In some embodiments, steps 308, 310, and 312 of process 300 of FIG. 3 can be implemented at least in part using process 600.

Process 600 shows an example process in which a service scheme for accessing services associated with responding to an API request associated with an application can be modified/improved at runtime.

At 602, an API request is received from an application at a proxy server, wherein the application corresponds to a first service scheme for accessing services associated with responding to the API request. The API request is received from the application executing at a device. There exists a current service scheme in place for servicing API requests from the application. In some embodiments, the current service scheme is implemented at least in part by the executed current set of proxy code associated with the application.

At 604, a property of the first service scheme that causes the API request to be serviced in a suboptimal manner is determined. In some embodiments, performance data associated with API requests previously serviced using the current service scheme is analyzed to determine whether a property of the current service scheme causes an API request to be serviced in a suboptimal manner based on configured suboptimal scheme rules.

At 606, a second service scheme for accessing services associated with responding to the API request is determined, wherein the second service scheme is configured to improve servicing of the API request. In response to the determination that the property of the current service scheme causes an API request to be serviced in a suboptimal manner, a new service scheme that corrects at least the suboptimal behavior and/or generally improves over the current service scheme is determined. For example, the new service scheme will cause, at runtime, the (e.g., a successful or a failed) response to the API request to be determined faster, improve the successful response rate of a target service for a service callout, maintain data in a cache storage for longer during a predicted period of need, and/or eliminate unnecessary service callouts.

At 608, the second service scheme is used to service the API request. In some embodiments, the new service scheme is implemented to service the API request based at least in part on modifying the set of proxy code and/or generating a new set of proxy code and executing (e.g., by the proxy server) the modified/new set of proxy code to cause the performance of the new service scheme. In some embodiments, the new service scheme is implemented to service the API request based at least in part on changing logic and/or other parameters associated with the proxy server to modify the manner the API request is serviced.

Figure 7:
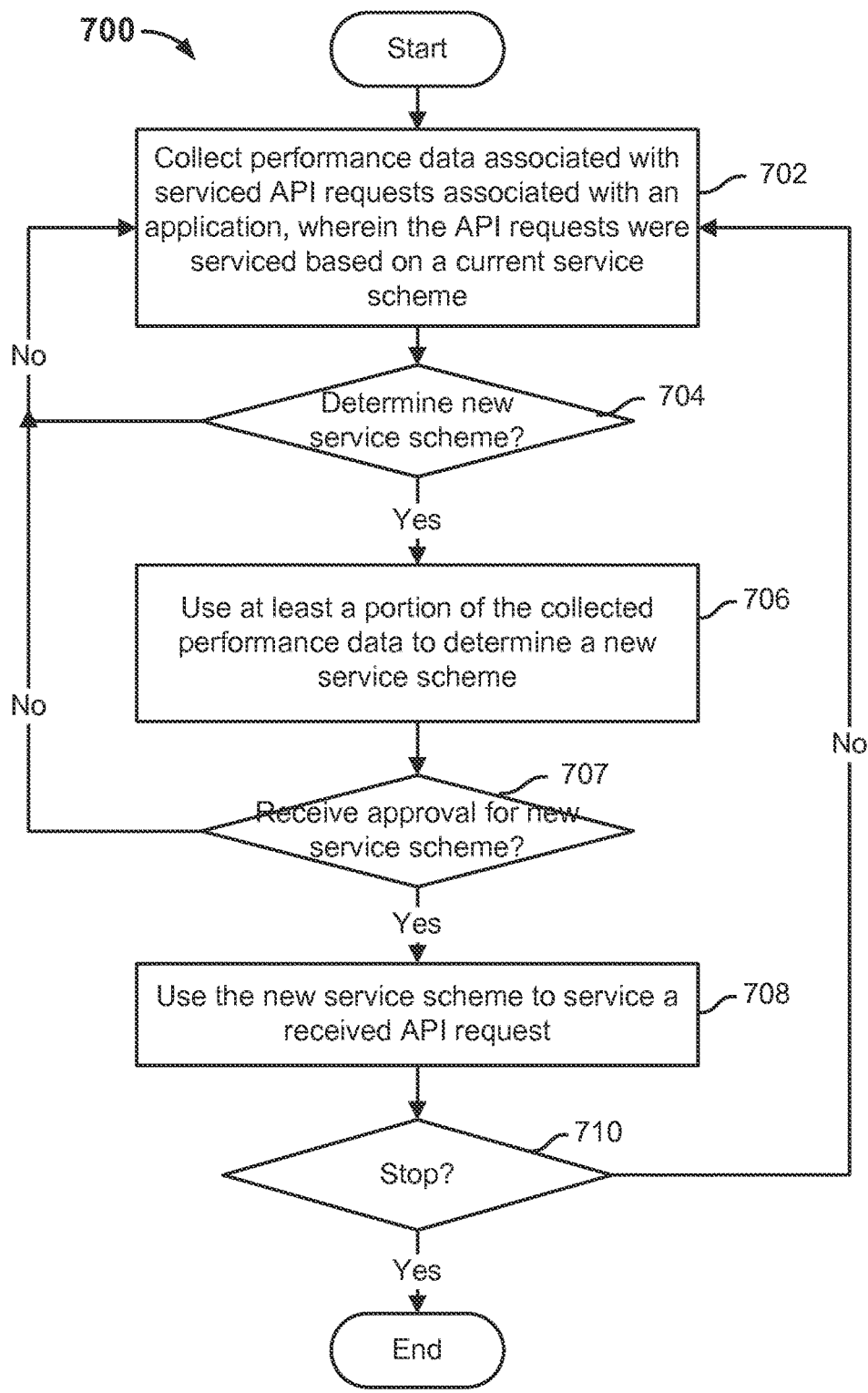
FIG. 7 is a flow diagram showing an embodiment of a process of determining a new service scheme for servicing an application at runtime.

FIG. 7 is a flow diagram showing an embodiment of a process of determining a new service scheme for servicing an application at runtime. In some embodiments, process 700 is implemented at system 100 of FIG. 1. Specifically, in some embodiments, process 700 is implemented at proxy server 108 of system 100 of FIG. 1. In some embodiments, steps 604, 606, and 608 of process 600 of FIG. 6 can be implemented at least in part using process 700.

At 702, performance data associated with serviced API requests associated with an application is collected, wherein the API requests were serviced based on a current service scheme. In some embodiments, various different properties associated with each serviced API request associated with each application, associated with the requestor (e.g., device) that sent the API request, associated with each service callout generated for the API request, and associated with the result (e.g., success or failure) of servicing the API request are stored.

At 704, it is determined whether a new service scheme is to be determined for the application. In various embodiments, one or more new service scheme conditions for determining a new service scheme are configured and when at least one of such conditions are met, a new service scheme is determined. In a first example, a new service scheme condition is that at least one property of the current service scheme matches a suboptimal scheme rule. In a second example, a new service scheme condition is that a threshold amount of performance data has been collected (e.g., a week's worth of data). In a third example, a new service scheme condition is that a threshold of poor performance (e.g., a configured percentage of failures) of a serviced API request has been met. In the event that a new service scheme is to be determined for the application, control is transferred to 706. Otherwise, in the event that a new service scheme is not to be determined for the application, control is returned to 702.

At 706, at least a portion of the collected performance data is used to determine a new service scheme. In some embodiments, collected performance data associated with a configured recent window of time is used to determine the new service scheme. For example, the most recent window of performance data is used to determine the new service scheme such that the new service scheme is determined based on the most up-to-date data. In some embodiments, the new service scheme is determined based at least in part on modifying at least a portion of the current set of proxy code. In some embodiments, the new service scheme is determined based at least in part on modifying parameters and/or logic associated with the proxy server. For example, a new service scheme may be determined by selecting to use a different service scheme option that is included in the set of proxy code. A set of proxy code can be written with thresholds and rules depending on the nature of the API request, various rules can be tested for threshold changes, and different service scheme options that have been previously added as proxy code can be selected and executed. In another example, a new service scheme may be determined by selecting a different execution path that is included in the current set of proxy code. In yet another example, a new service scheme may be determined by causing the current set of proxy code to offload processing to a third party entity entirely in certain situations i.e., a new entity can be introduced to take over processing.

At 707, it is determined whether approval has been received from a developer associated with the application for the new service scheme. In some embodiments, prior to implementing the new service scheme, a notification describing the suggested modifications to the currently used service scheme is first sent to the application developer. For example, an email and/or a message at a user interface describing the suggested modifications is first sent to the application developer. In response to the notification, the application developer can input a feedback that either approves or does not approve the application of the modifications. In the event that approval has been received, control is transferred to 708. Otherwise, in the event that approval has not been received, control is returned to 702.

At 708, the new service scheme is used to service a received API request associated with the application. In some embodiments, the new service scheme is used to service a received API request associated with the application based at least in part on executing the modified set of proxy code in place of the previous version of the proxy code.

At 710, it is determined whether the process should be stopped. For example, process 700 may be stopped in the event that the proxy server is shut down. In the event the process is determined to be stopped, process 700 ends. Otherwise, in the event that the process is not determined to be stopped, control is returned to 702.

Figure 8:
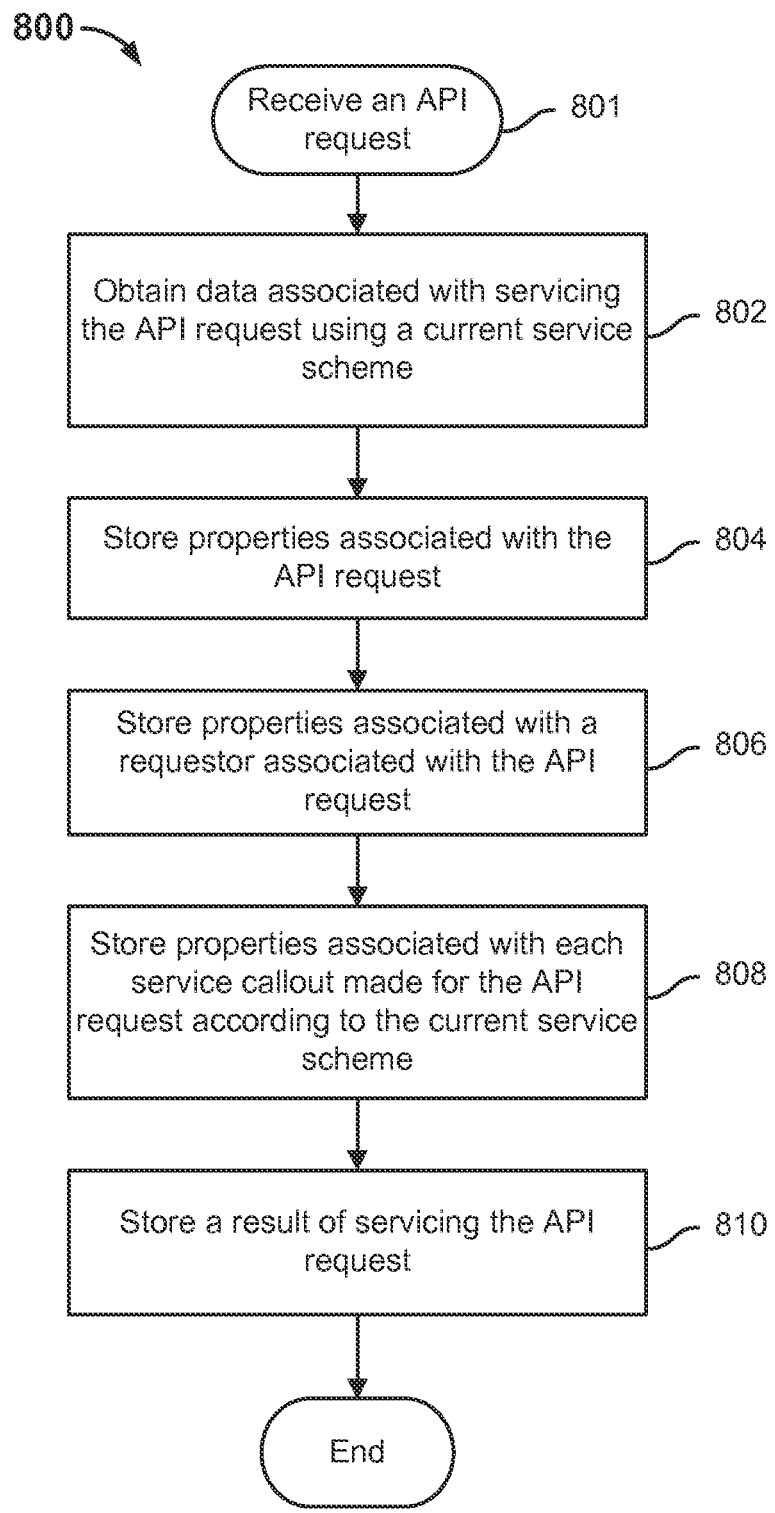
FIG. 8 is a flow diagram showing an example of a process of collecting performance data for servicing an application at runtime.

FIG. 8 is a flow diagram showing an example of a process of collecting performance data for servicing an application at runtime. In some embodiments, process 800 is implemented at system 100 of FIG. 1. Specifically, in some embodiments, process 800 is implemented at proxy server 108 of system 100 of FIG. 1. In some embodiments, step 702 of process 700 of FIG. 7 can be implemented at least in part using process 800.

Process 800 is an example process by which different types of performance data are collected for API requests associated with an application serviced by a current service scheme.

At 801, an API request associated with an application is received. At 802, data associated with servicing the API request using a current service scheme is obtained.

At 804, properties associated with the API request are stored. Performance data associated with the API request to be stored include, for example, one or more of the following: identifying information associated with the application with which the API request was associated and a time/date at which the API request was sent to or received at the proxy server.

At 806, properties associated with a requestor associated with the API request are stored. Performance data associated with the requestor associated with the API request to be stored include, for example, one or more of the following: the type of device from which the API request originated, the type of operating system running on the device from which the API request originated, and identifying information associated with the user that has logged into the application.

At 808, properties associated with each service callout made for the API request according to the current service scheme are stored. The current service scheme, which is determined at least in part by the current set of proxy code associated with the application, dictates the service callouts that are generated and sent for the API request. Performance data associated with each service callout sent for the API request to be stored include, for example, one or more of the following: a type associated with the target service, a target data (e.g., located at a target URL), the amount of time after which a response to the service callout was received at the proxy server from the target service, whether an error was received from the target service, the type of error that was received from the target service (if an error was received), and current performance metrics associated with the target service. Examples of current performance metrics associated with the target service include current CPU utilization of the target service, the current memory utilization of the target service, and current I/O utilization of the target service.

At 810, a result of servicing the API request is stored. A result of servicing the API request is successful if a response to the API request could be successfully generated based on the responses to the individual service callouts. A result of servicing the API request is unsuccessful or failed if a response to the API request could not be successfully generated based on the responses to the individual service callouts and/or any one of the individual service callouts failed to obtain the requested data from the target service.

Each of FIGS. 9 through 12 illustrates a different example in which a new service scheme can be generated based on performance data collected at runtime and various suboptimal scheme rules.

Figure 9:
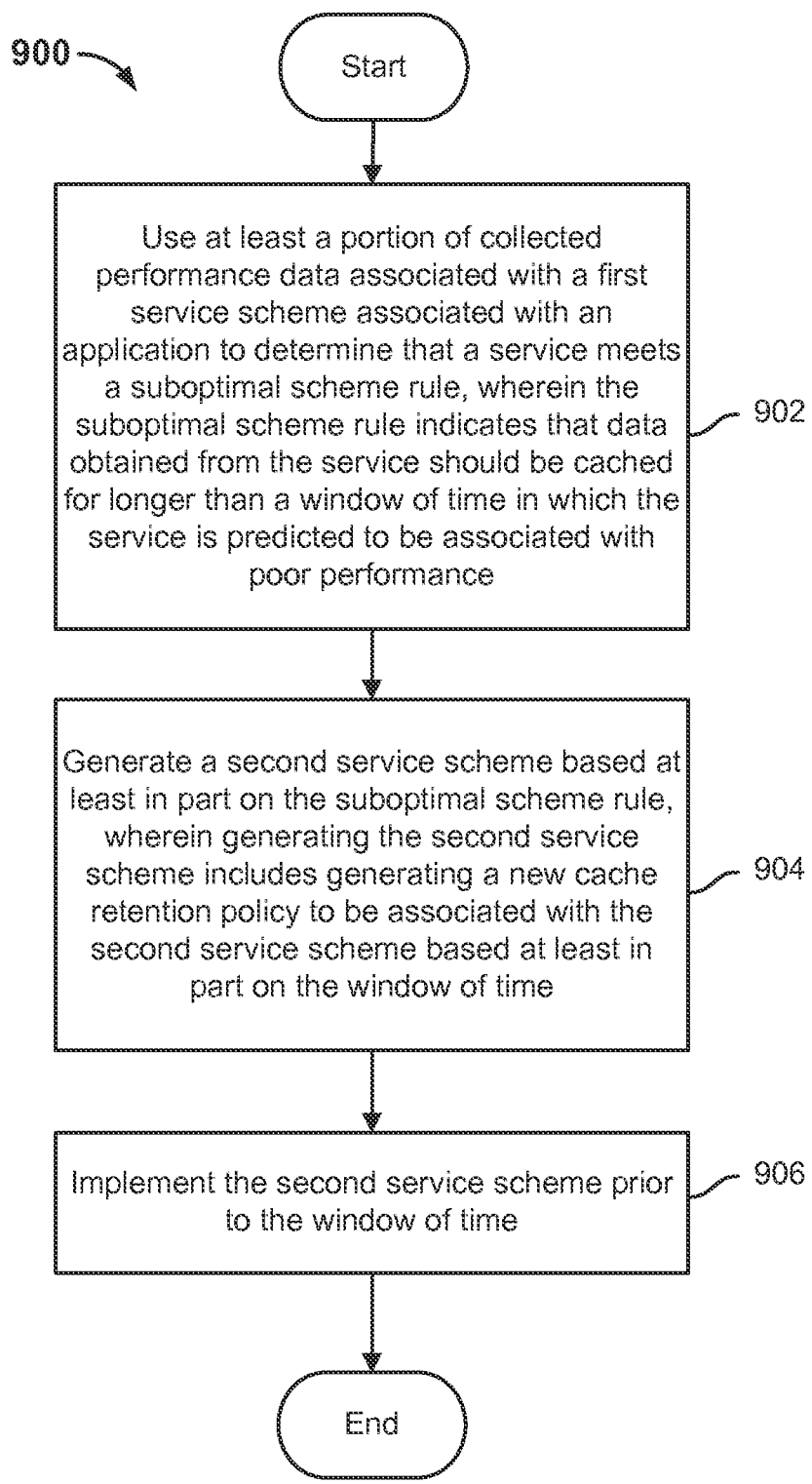
FIG. 9 is a flow diagram showing an example of a process of implementing a new service scheme based on performance data collected at runtime.

FIG. 9 is a flow diagram showing an example of a process of implementing a new service scheme based on performance data collected at runtime. In some embodiments, process 900 is implemented at system 100 of FIG. 1. Specifically, in some embodiments, process 900 is implemented at proxy server 108 of system 100 of FIG. 1. In some embodiments, steps 604, 606, and 608 of process 600 of FIG. 6 can be implemented at least in part using process 900.

Process 900 is an example process of generating a new service scheme that includes a new policy associated with data stored at the cache managed by the proxy server.

At 902, at least a portion of collected performance data associated with a first service scheme associated with an application is used to determine that a service meets a suboptimal scheme rule, wherein the suboptimal scheme rule indicates that data obtained from the service should be cached for longer than a window of time in which the service is predicted to be associated with poor performance. In some embodiments, some suboptimal scheme rules can describe conditions/criteria associated with suboptimal caching of data retrieved from certain services. As described above, in some embodiments, a proxy server is configured to manage a cache that stores data previously received from one or more services. In some embodiments, a policy associated with data stored in the cache is determined by a service scheme associated with the application for which the data is accessed. Such suboptimal scheme rules with conditions/criteria associated with suboptimal caching of data can be used with at least a portion (e.g., a set of recent subset) of performance data associated with API requests associated with an application that were serviced by the current service scheme to determine whether there is a window of time during each day, week, or any other configured unit of time, in which a service is historically associated with a performance that meets a condition/criterion for poor performance. For example, meets a condition/criterion for poor performance is that the failure rate to respond to service callouts by the service is above a threshold percentage.

For example, it is determined from the collected performance data that service A has a historical response failure rate that is greater than a threshold percentage of 60% during every 7:00 am to 10:00 am each day. As such, the proxy server predicts that service A will exhibit poor performance during 7:00 am to 10:00 am each day.

At 904, a second service scheme is generated based at least in part on the suboptimal scheme rule, wherein generating the second service scheme includes generating a new cache retention policy to be associated with the second service scheme based at least in part on the window of time. A new service scheme can be determined based on a prescribed action of the matching suboptimal scheme rule. Specifically, in this example, because the suboptimal scheme rule relates to a predicted time window of poor performance by a service, the suboptimal scheme rule may also prescribe an action that will mitigate the negative effects of the service during its predicted period of poor performance. For example, the prescribed action of the matching suboptimal scheme rule will first check whether the existing cache retention policy associated with the current service scheme stores data obtained from service A in the cache for at least the duration of the predicted time window of poor performance. A cache retention policy refers to the length of time that data will be stored in a cache (e.g., before it is deleted, timed-out, and/or otherwise not usable). If it is determined that the existing cache retention policy associated with the current service scheme does not store data obtained from service A in the cache for at least the duration of the predicted time window of poor performance, then the prescribed action included in the suboptimal scheme rule instructs to generate a new service scheme that includes a new cache retention policy that retains data in the cache for at least the length of time of the predicted time window of poor performance. For example, the existing cache retention policy associated with the current service scheme may have been a default setting associated with the policy server, a value configured by the application developer in a submitted set of proxy code associated with the application, and/or a value determined by the policy server based on a previous analysis of performance data. In some embodiments, the new service scheme with the new cache retention policy is generated at least in part by modifying the set of proxy code associated with the application.

Returning to the example above, the time period of the existing cache retention policy was one hour, which is shorter than service A's predicted three hours of poor performance. Therefore, in the new service scheme, the time period of the new cache retention policy is extended to four hours, which is greater than service A's predicted three hours of poor performance. By extending the time period of the new cache retention policy in the new service scheme, data obtained from service A prior to the predicted time window of poor performance may potentially be retained in the cache for at least the duration of the predicted time window of poor performance and potentially be used to service a service callout before the service callout is sent to service A during the predicted time window of poor performance.

At 906, the second service scheme is implemented prior to the window of time. The new service scheme with the new cache retention policy is implemented ahead of the predicted time window of poor performance to ensure that the new cache retention policy can be applied to data accessed from the service associated with the predicted poor performance and cause cached data to service any service callouts executed during the predicted time window to avoid those service callouts from being sent to the service for which little chance for a successful response is expected. In some embodiments, the new service scheme may revert back to the previous cache retention policy after the service's predicted time window of poor performance is over.

Returning to the previous example, because the predicted time window of poor performance of service A is 7:00 am to 10:00 am each day and the new cache retention policy for data obtained from service A of the new service scheme retains data for four hours in the cache, the new cache retention policy of the new service scheme may be implemented some time before 7:00 am each day, such as, for example, 6:30 am. In some embodiments, after 10:00 am each day, after the conclusion of the predicted time window of poor performance, the cache retention policy can revert back to retaining data obtained from service A for only one hour.

Figure 10:
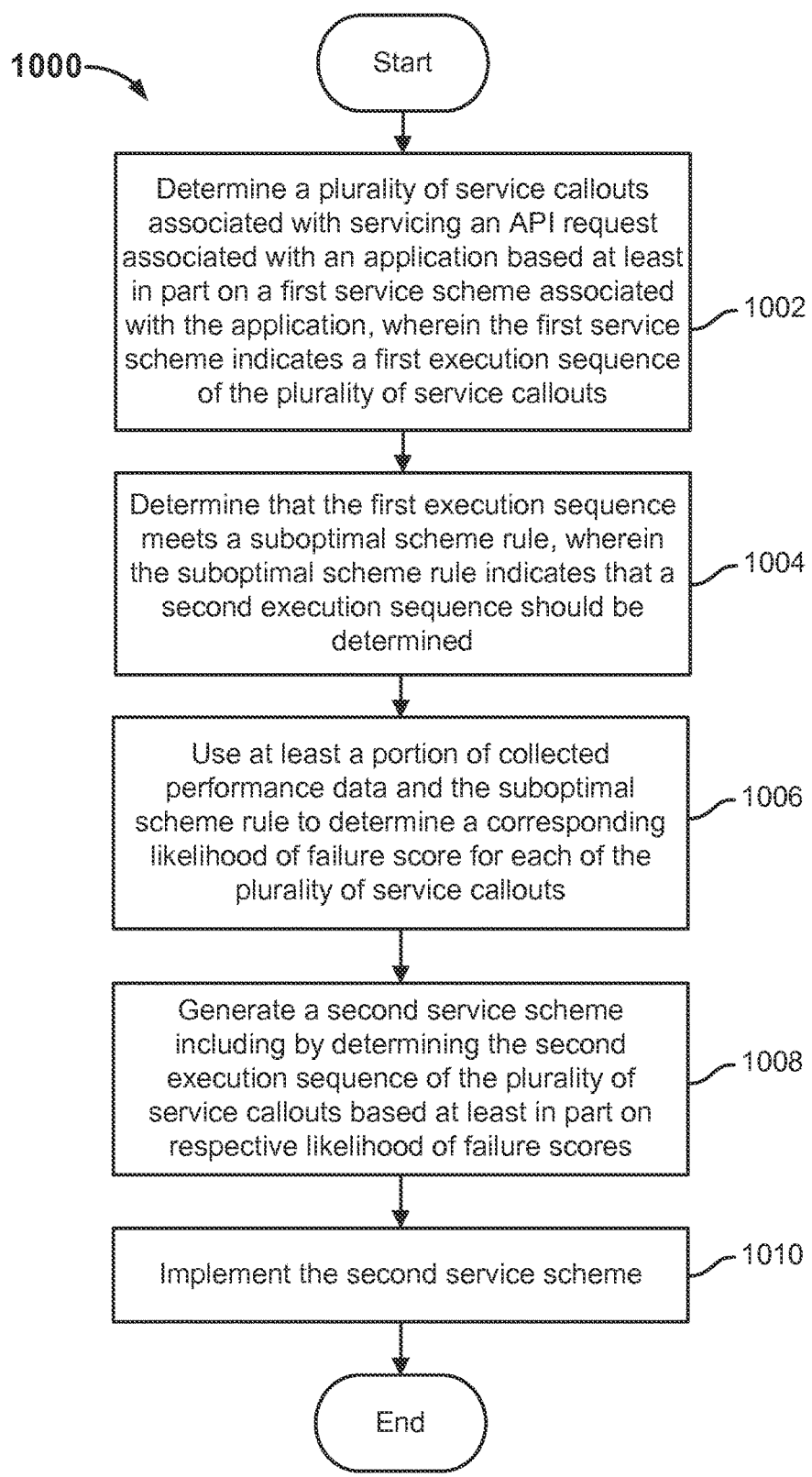
FIG. 10 is a flow diagram showing an example of a process of implementing a new service scheme based on performance data collected at runtime.

FIG. 10 is a flow diagram showing an example of a process of implementing a new service scheme based on performance data collected at runtime. In some embodiments, process 1000 is implemented at system 100 of FIG. 1. Specifically, in some embodiments, process 1000 is implemented at proxy server 108 of system 100 of FIG. 1. In some embodiments, steps 604, 606, and 608 of process 600 of FIG. 6 can be implemented at least in part using process 1000.

Process 1000 is an example process of generating a new service scheme that includes a new execution sequence for the service callouts associated with an API request associated with an application.

At 1002, a plurality of service callouts associated with servicing an API request associated with an application is determined based at least in part on a first service scheme associated with the application, wherein the first service scheme indicates a first execution sequence of the first plurality of service callouts. The service callouts associated with a current service scheme of an application and the sequence in which they are executed are determined. In some embodiments, the service callouts associated with the current service scheme of the application and the sequence in which they are executed are determined from a current set of proxy code associated with the application.

For example, for an API request of a particular application, a service callout is to be sent to service A, a service callout is to be sent to service B, and a service callout is to be sent to service C. The sequence in which the service callouts are to be sent to their respective services is service A first, service B second, and service C last. Put another way, the service callout to service A is sent first, the service callout to service B is sent sometime after the service callout to service A was sent (but not necessarily after a response was returned from service A), and then the service callout to service C is sent sometime after the service callout to service B was sent (but not necessarily after responses were returned from service A and/or service B).

At 1004, it is determined that the first execution sequence meets a suboptimal scheme rule, wherein the suboptimal scheme rule indicates that a second execution sequence should be determined. In some embodiments, some suboptimal scheme rules can describe conditions/criteria associated with a suboptimal sequence in which service callouts are sent to their respective services. As mentioned above, the successful response to an API request relies on a response being successfully returned from each individual service to which a service callout was sent. Put another way, a failed response to the API request is generated when any one of services to which a service callout was sent returns a failure message. Different services may take different amounts of time to respond to a service callout with a successful response or a failure message. As such, it is desirable to send a service callout to a service that is predicted to return a failure message the fastest so that the failed response to the API request can be generated as soon as possible and returned to the application/device from which the API request was received. Once a failure message is received from any target service, the failed response can be returned to the application/device from which the API request was received without waiting for further service responses and/or sending additional service callouts that have not yet been sent in the execution sequence. In this way, the application or user of the application can receive the result of the API request as soon as possible and decide whether to resend the API request, if appropriate.

In some embodiments, a suboptimal scheme rule with conditions/criteria associated with a suboptimal sequence in which service callouts are sent to their respective services can indicate that a new execution sequence of the service callouts should be generated after a previous execution sequence has been used for a configured period of time. It can be assumed that the execution sequence of service callouts can be improved periodically based on the latest collected performance data. For example, the suboptimal scheme rule may indicate that an execution sequence that has been used for at least one week should be replaced with a new execution sequence.

At 1006, at least a portion of collected performance data and the suboptimal scheme rule is used to determine a corresponding likelihood of failure score for each of the plurality of service callouts. A new service scheme can be determined based on a prescribed action of the matching suboptimal scheme rule. Specifically, in this example, because the suboptimal scheme rule relates to a suboptimal execution sequence of service callouts, the suboptimal scheme rule may also prescribe an action of generating a new service scheme that includes a new execution sequence that orders the service callouts to the service(s) in descending order of likelihood of failing the fastest. In some embodiments, the prescribed action may indicate a technique by which performance data can be used to determine a likelihood of failure score for each of the service callouts. For example, the likelihood of failure score for each of the service callouts is a function of the average historical response time from the target service and/or the average probability of receiving a failure message from the target service. For example, the greater the likelihood of failure score that is determined for a service callout, the more quickly the target service of that service callout is predicted to return a failure message.

At 1008, a second service scheme is generated including by determining the second execution sequence of the plurality of service callouts based at least in part on respective likelihood of failure scores. The new execution sequence of the service callouts may be based in descending order of the likelihood of failure scores of the service callouts, such that the target service of the service callout with the highest likelihood of failure score is predicted to fail the fastest (and is therefore contacted first) and the target service of the service callout with the lowest likelihood of failure score is predicted to fail the slowest (and is therefore contacted last or not at all). In some embodiments, the new service scheme with the new execution sequence is determined by modifying the set of proxy code associated with the application.

Returning to the example above, a likelihood of failure score is determined for the service callout to each of services A, B, and C based on the performance data. Assume that the service callout to service B is associated with the greatest likelihood of failure score, the service callout to service C is associated with the second to the greatest likelihood of failure score, and the service callout to service A is associated with the least likelihood of failure score. As such, the new execution sequence of the service callouts to be included in the new service scheme indicates that a service callout is to be sent to service B first, a service callout is to be sent to service C second, and a service callout is to be sent to service A last.

At 1010, the second service scheme is implemented.

Figure 11:
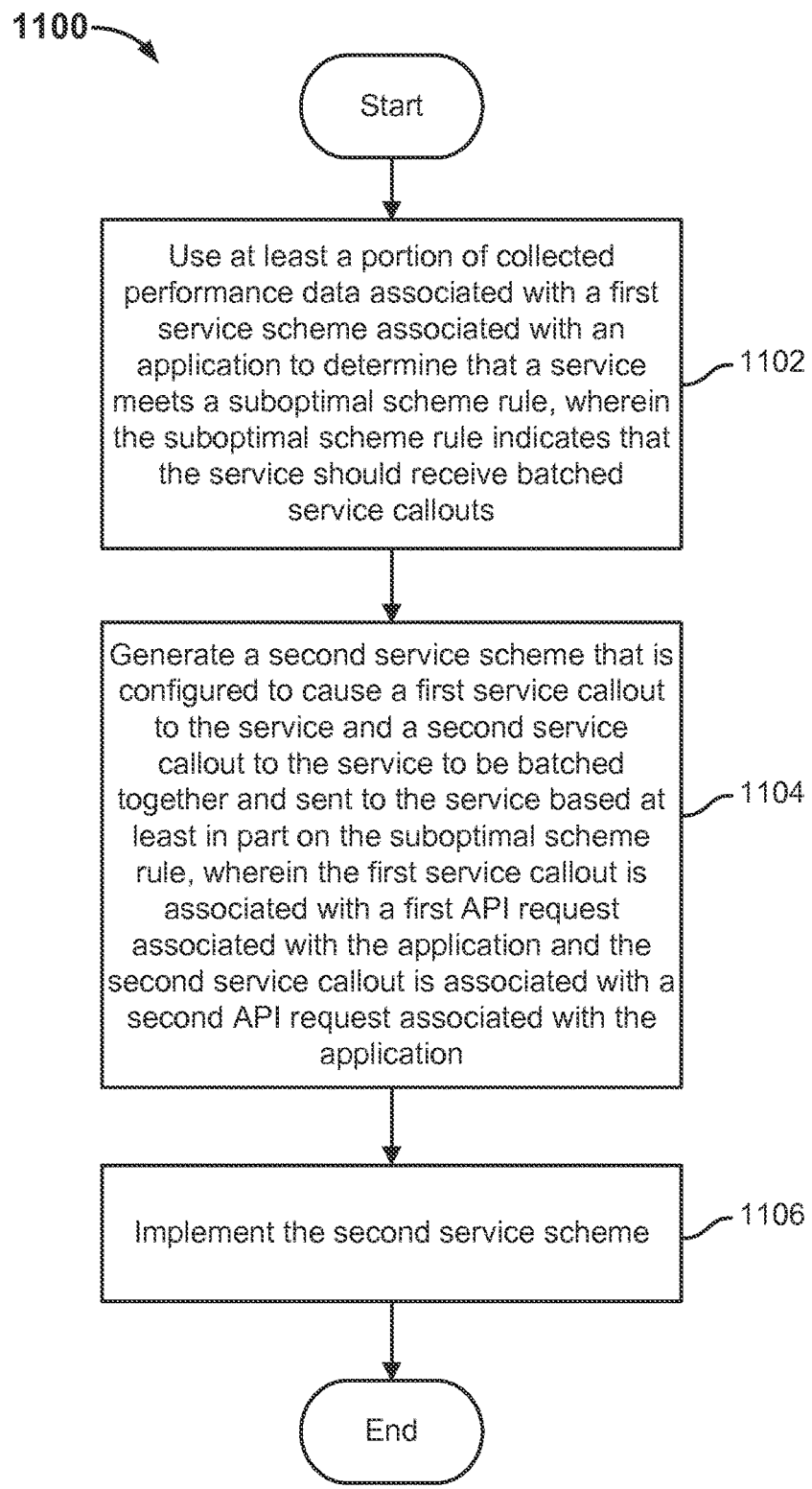
FIG. 11 is a flow diagram showing an example of a process of implementing a new service scheme based on performance data collected at runtime.

FIG. 11 is a flow diagram showing an example of a process of implementing a new service scheme based on performance data collected at runtime. In some embodiments, process 1100 is implemented at system 100 of FIG. 1. Specifically, in some embodiments, process 1100 is implemented at proxy server 108 of system 100 of FIG. 1. In some embodiments, steps 604, 606, and 608 of process 600 of FIG. 6 can be implemented at least in part using process 1100.

Process 1100 is an example process of generating a new service scheme that includes batching service callouts to the same target service across different API requests.

At 1102, at least a portion of collected performance data associated with a first service scheme associated with an application is used to determine that a service meets a suboptimal scheme rule, wherein the suboptimal scheme rule indicates that the service should receive batched service callouts. In some embodiments, some suboptimal scheme rules can describe conditions/criteria associated with a suboptimal manner in which service callouts are sent to a service. For example, one such suboptimal scheme rule can indicate that a service that has a historical response failure rate above a configured threshold is suboptimal and that multiple service callouts to that service should be sent to the service as a batch. The service will handle a single service callout or a batch of multiple service callouts with the same rate of failure. As such, if a batch of multiple service callouts is sent to the service at once, then there is a chance that the service will be able to unpack the batch of service callouts and respond to each individual service callout. Put another way, by sending a package to a service associated with a historical response failure rate above a configured threshold, the service may not successfully process each received package, but each time that the service is able to process a received package, a batch of multiple service callouts can be responded to at once.

At 1104, a second service scheme that is configured to cause a first service callout to the service and a second service callout to the service to be batched together and sent to the service is generated based at least in part on the suboptimal scheme rule, wherein the first service callout is associated with a first API request associated with the application and the second service callout is associated with a second API request associated with the application. A new service scheme can be determined based on a prescribed action of the matching suboptimal scheme rule. Specifically, in this example, because the suboptimal scheme rule relates to a suboptimal manner in which service callouts are sent to a service, the suboptimal scheme rule may also prescribe an action of generating a new service scheme that causes the new/modified service scheme to send batches of service callouts to the service each time. For example, the new service scheme will include up to a configured number of service callouts for the same target service into a batch, across various API requests, and then send the batch of service callouts to the service at once. The first and second API requests may be received from the same or different devices.

At 1106, the second service scheme is implemented.

Figure 12:
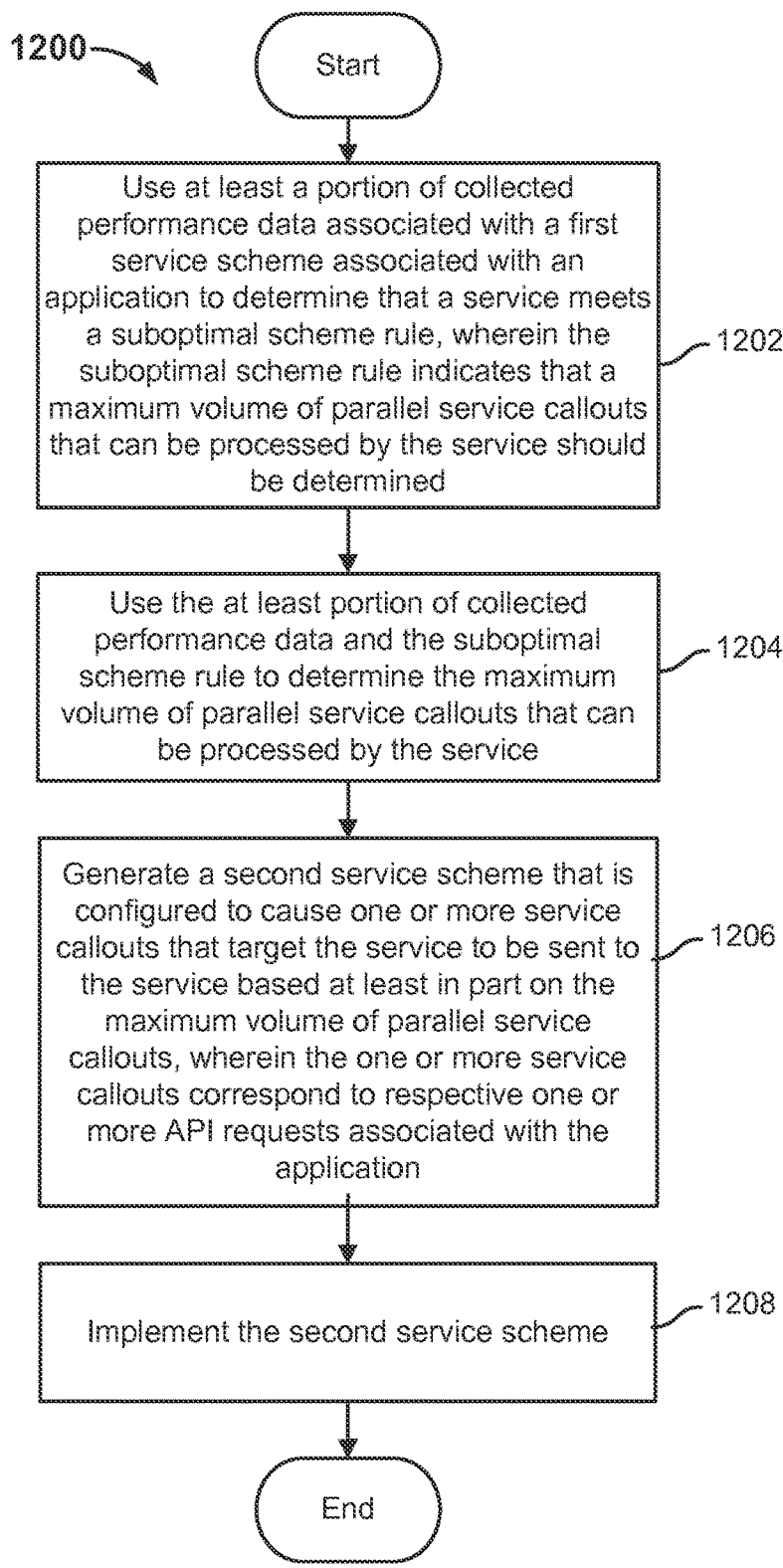
FIG. 12 is a flow diagram showing an example of a process of implementing a new service scheme based on performance data collected at runtime.

FIG. 12 is a flow diagram showing an example of a process of implementing a new service scheme based on performance data collected at runtime. In some embodiments, process 1200 is implemented at system 100 of FIG. 1. Specifically, in some embodiments, process 1200 is implemented at proxy server 108 of system 100 of FIG. 1. In some embodiments, steps 604, 606, and 608 of process 600 of FIG. 6 can be implemented at least in part using process 1200.

Process 1200 is an example process of generating a new service scheme that includes sending a certain number of parallel service callouts to target service across based on a maximum volume of parallel service callouts.

At 1202, at least a portion of collected performance data associated with a first service scheme associated with an application is used to determine that a service meets a suboptimal scheme rule, wherein the suboptimal scheme rule indicates that a maximum volume of parallel service callouts that can be processed by the service should be determined. In some embodiments, some suboptimal scheme rules can describe conditions/criteria associated with a suboptimal manner in which parallel service callouts are sent to a service. For example, one such suboptimal scheme rule can indicate that a service that has a historical response failure rate above a configured threshold is suboptimal and that a maximum volume of parallel service callouts that can be processed by the service should be determined. Certain services may only be able to process less than a certain volume of service callouts at least partially in parallel before being associated with a relatively high fail rate. As such, the maximum volume of parallel service callouts that can be processed by the service can be determined and be used to avoid sending more than the maximum volume of parallel service callouts to the service. For example, the volume of parallel service callouts may not necessarily refer to sending multiple services all at once but rather sending a number of service callouts that are sent, at least partially in parallel, to the service over a given period of time.

At 1204, the at least portion of collected performance data and the suboptimal scheme rule are used to determine the maximum volume of parallel service callouts that can be processed by the service. A new service scheme can be determined based on a prescribed action of the matching suboptimal scheme rule. Specifically, in this example, because the suboptimal scheme rule relates to a suboptimal manner in which service callouts are sent to a service, the suboptimal scheme rule may also prescribe an action of generating a new service scheme that avoids sending more than the maximum volume of parallel service callouts to the service. In some embodiments, the prescribed action may indicate a technique by which performance data can be used to determine the maximum volume of parallel service callouts that can be processed by the service. For example, the maximum volume of parallel service callouts that can be processed by the service can be determined by generating a graph that includes a set of data associated with various service callout volumes sent in parallel to the service and a set of data associated with the response time and/or response failure rate corresponding to each service callout volume. The maximum volume of parallel service callouts is the volume in the graph that corresponds to a highest unacceptable response time and/or response failure rate that is provided by the suboptimal scheme rule.

At 1206, a second service scheme that is configured to cause one or more service callouts that target the service to be sent to the service based at least in part on the maximum volume of parallel service callouts that can be processed by the service, wherein the one or more service callouts correspond to respective one or more API requests associated with the application. The new service scheme uses the maximum volume of parallel service callouts to ensure that the number of at least parallel service callouts across one or more API requests that it sends to the service does not exceed the maximum volume of parallel service callouts.

At 1208, the second service scheme is implemented.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor; and
a proxy code storage coupled to the processor, wherein the proxy code storage is configured to receive, at development time, a set of proxy code for servicing an application at a proxy server, wherein the set of proxy code is configured to be executed at runtime, wherein the set of proxy code corresponds to a first service scheme to be performed by the processor for accessing services associated with responding to an Application Programming Interface (API) request associated with the application, wherein the first service scheme describes the processor being configured to:
in response to receipt of the API request at the runtime, generate a plurality of service callouts, wherein the runtime occurs subsequent to the development time;

send, at the runtime, the plurality of service callouts to one or more service servers based at least in part on a first execution sequence specified by the first service scheme, wherein the first execution sequence describes an order of sending each of the plurality of service callouts to a respective service server; and determine, at the runtime, a response to the API request based at least in part on data received from the one or more service servers in response to the plurality of service callouts;

wherein the processor is configured to:

determine, at the development time, a property of the first service scheme that will cause the API request to be serviced in a suboptimal manner based at least in part on analyzing the set of proxy code;

determine, at the development time, a second service scheme for accessing services associated with responding to the API request, wherein the second service scheme is configured to improve servicing of the API request at the runtime; and modify, at the development time, the set of proxy code to correspond to the second service scheme.

2. The system of claim 1, wherein the property of the first service scheme that will cause the API request to be serviced in the suboptimal manner comprises redundant service callouts.

3. The system of claim 2, wherein to determine the second service scheme includes determining a modification to the set of proxy code to eliminate at least some of the redundant service callouts.

4. The system of claim 1, wherein the property of the first service scheme that will cause the API request to be serviced in the suboptimal manner comprises including two independent service callouts that are configured to be executed serially.

5. The system of claim 4, wherein to determine the second service scheme includes determining a modification to the set of proxy code to cause a first service callout of the two independent service callouts to be executed at least partially parallel to a second service callout of the two independent service callouts.

6. A system, comprising:

a processor configured to:

receive, at runtime, an API request from an application at a proxy server, wherein the application corresponds to a first service scheme for accessing services associated with responding to the API request;

execute, at the runtime, a set of proxy code to implement the first service scheme, wherein the first service scheme describes the processor being configured to:

in response to receipt of the API request at the runtime, generate a plurality of service callouts;

send, at the runtime, the plurality of service callouts to one or more service servers based at least in part on a first execution sequence specified by the first service scheme, wherein the first execution sequence describes an order of sending each of the plurality of service callouts to a respective service server; and determine, at the runtime, a response to the API request based at least in part on data received from the one or more service servers in response to the plurality of service callouts; and collect, at the runtime, performance data associated with a previously serviced API request, wherein the previously serviced API request was serviced based at least in part on the first service scheme;

determine, at the runtime, a property of the first service scheme that causes the API request to be serviced in a suboptimal manner based at least in part on the collected performance data;

modify, at the runtime, the set of proxy code to correspond to a second service scheme for accessing services associated with responding to the API request, wherein the second service scheme is configured to improve servicing of the API request; and use the second service scheme to service the API request.

7. The system of claim 6, wherein the performance data includes one or more of the following: properties associated with the previously serviced API request, properties associated with a requestor associated with the previously serviced API request, properties associated with a service callout made for the previously serviced API request, and a result associated with servicing the previously serviced API request.

8. The system of claim 6, wherein to determine the property of the first service scheme that causes the API request to be serviced in the suboptimal manner comprises to use at least a portion of collected performance data to determine that a service meets a suboptimal scheme rule, wherein the suboptimal scheme rule indicates that data obtained from the service should be cached for longer than a window of time in which the service is predicted to be associated with poor performance.

9. The system of claim 8, wherein to determine the second service scheme for accessing services associated with responding to the API request includes to generate a new cache retention policy to be associated with the second service scheme based at least in part on the window of time.

10. The system of claim 9, wherein the processor is configured to implement the second service scheme prior to the window of time.

11. The system of claim 6, wherein to determine the property of the first service scheme that causes the API request to be serviced in the suboptimal manner comprises to determine that the first execution sequence meets a suboptimal scheme rule.

12. The system of claim 11, wherein to determine the second service scheme for accessing services associated with responding to the API request includes to use at least a portion of the collected performance data to determine a corresponding likelihood of failure score for each of the plurality of service callouts.

13. The system of claim 12, wherein to determine the second service scheme for accessing services associated with responding to the API request includes to determine a second execution sequence of the plurality of service callouts based at least in part on respective likelihood of failure scores.

14. The system of claim 6, wherein to determine the property of the first service scheme that causes the API request to be serviced in the suboptimal manner comprises to use at least a portion of collected performance data to determine that a service meets a suboptimal scheme rule, wherein the suboptimal scheme rule indicates that the service should receive batched service callouts.

15. The system of claim 14, wherein the second service scheme is configured to cause a first service callout to the service and a second service callout to the service to be batched together and sent to the service, wherein the first service callout is associated with a first API request associated with the application and the second service callout is associated with a second API request associated with the application.

16. The system of claim 6, wherein to determine the property of the first service scheme that causes the API request to be serviced in the suboptimal manner comprises to use at least a portion of collected performance data to determine that a service meets a suboptimal scheme rule, wherein the suboptimal scheme rule indicates that a maximum volume of parallel service callouts that can be processed by the service should be determined.

17. The system of claim 16, wherein the processor is further configured to use the at least portion of collected performance data to determine the maximum volume of parallel service callouts that can be processed by the service.

18. The system of claim 17, wherein the second service scheme is configured to cause one or more service callouts that target the service to be sent to the service based at least in part on the maximum volume of parallel service callouts, wherein the one or more service callouts correspond to respective one or more API requests associated with the application.

19. A method, comprising:
receiving, using a processor, at development time, a set of proxy code for servicing an application at a proxy server, wherein the set of proxy code is configured to be executed at runtime, wherein the set of proxy code corresponds to a first service scheme to be performed by the processor for accessing services associated with responding to an Application Programming Interface (API) request associated with the application, wherein the first service scheme describes the processor being configured to:
in response to the API request at the runtime, generate a plurality of service callouts, wherein the runtime occurs subsequent to the development time;
send, at the runtime, the plurality of service callouts to one or more service servers based at least in part on a first execution sequence specified by the first service scheme, wherein the first execution sequence describes an order of sending each of the plurality of service callouts to a respective service server; and
determine, at the runtime, a response to the API request based at least in part on data received from the one or more service servers in response to the plurality of service callouts;
determining, at the development time, a property of the first service scheme that will cause the API request to be serviced in a suboptimal manner based at least in part on analyzing the set of proxy code;
determining, at the development time, a second service scheme for accessing services associated with responding to the API request, wherein the second service scheme is configured to improve servicing of the API request at the runtime; and
modifying, at the development time, the set of proxy code to correspond to the second service scheme.

20. The method of claim 19, wherein the property of the first service scheme that will cause the API request to be serviced in the suboptimal manner comprises redundant service callouts.

21. The method of claim 20, wherein determining the second service scheme includes determining a modification to the set of proxy code to eliminate at least some of the redundant service callouts.

22. The method of claim 19, wherein the property of the first service scheme that will cause the API request to be serviced in the suboptimal manner comprises including two independent service callouts that are configured to be executed serially.

23. The method of claim 22, wherein determining the second service scheme includes determining a modification to the set of proxy code to cause a first service callout of the two independent service callouts to be executed at least partially parallel to a second service callout of the two independent service callouts.

24. A method, comprising:
receiving, using a processor, at runtime, an API request from an application at a proxy server, wherein the application corresponds to a first service scheme for accessing services associated with responding to the API request;
executing, at the runtime, a set of proxy code to implement the first service scheme, wherein the first service scheme describes the processor being configured to:
in response to receipt of to the API request at the runtime, generate a plurality of service callouts;
send, at the runtime, the plurality of service callouts to one or more service servers based at least in part on a first execution sequence specified by the first service scheme, wherein the first execution sequence describes an order of sending each of the plurality of service callouts to a respective service server; and
determine, at the runtime, a response to the API request based at least in part on data received from the one or more service servers in response to the plurality of service callouts; and
collecting, at the runtime, performance data associated with a previously serviced API request, wherein the previously serviced API request was serviced based at least in part on the first service scheme;
determining, at the runtime, a property of the first service scheme that causes the API request to be serviced in a suboptimal manner based at least in part on the collected performance data;
modifying, at the runtime, the set of proxy code to correspond to a second service scheme for accessing services associated with responding to the API request, wherein the second service scheme is configured to improve servicing of the API request; and
using the second service scheme to service the API request.

25. The method of claim 24, wherein the performance data includes one or more of the following: properties associated with the previously serviced API request, properties associated with a requestor associated with the previously serviced API request, properties associated with a service callout made for the previously serviced API request, and a result associated with servicing the previously serviced API request.

26. The method of claim 24, wherein determining the property of the first service scheme that causes the API request to be serviced in the suboptimal manner comprises to use at least a portion of collected performance data to determine that a service meets a suboptimal scheme rule, wherein the suboptimal scheme rule indicates that data obtained from the service should be cached for longer than a window of time in which the service is predicted to be associated with poor performance.

27. The method of claim 26, wherein determining the second service scheme for accessing services associated with responding to the API request includes generating a new cache retention policy to be associated with the second service scheme based at least in part on the window of time.

28. The method of claim 27, wherein the second service scheme is implemented prior to the window of time.

29. The method of claim 24, wherein determining the property of the first service scheme that causes the API request to be serviced in the suboptimal manner comprises determining that the first execution sequence meets a suboptimal scheme rule.

30. The method of claim 29, wherein determining the second service scheme for accessing services associated with responding to the API request includes using at least a portion of the collected performance data to determine a corresponding likelihood of failure score for each of the plurality of service callouts.

31. The method of claim 30, wherein determining the second service scheme for accessing services associated with responding to the API request includes determining a second execution sequence of the plurality of service callouts based at least in part on respective likelihood of failure scores.

32. The method of claim 24, wherein determining the property of the first service scheme that causes the API request to be serviced in the suboptimal manner comprises using at least a portion of collected performance data to determine that a service meets a suboptimal scheme rule, wherein the suboptimal scheme rule indicates that the service should receive batched service callouts.

33. The method of claim 32, wherein the second service scheme is configured to cause a first service callout to the service and a second service callout to the service to be batched together and sent to the service, wherein the first service callout is associated with a first API request associated with the application and the second service callout is associated with a second API request associated with the application.

34. The method of claim 24, wherein determining the property of the first service scheme that causes the API request to be serviced in the suboptimal manner comprises using at least a portion of collected performance data to determine that a service meets a suboptimal scheme rule, wherein the suboptimal scheme rule indicates that a maximum volume of parallel service callouts that can be processed by the service should be determined.

35. The method of claim 34, further comprising using the at least portion of collected performance data to determine the maximum volume of parallel service callouts that can be processed by the service.

36. The method of claim 35, wherein the second service scheme is configured to cause one or more service callouts that target the service to be sent to the service based at least in part on the maximum volume of parallel service callouts, wherein the one or more service callouts correspond to respective one or more API requests associated with the application.

* * * * *

UNITED STATES PATENT AND TRADEMARK OFFICE
CERTIFICATE OF CORRECTION

PATENT NO.        : 9,600,251 B1  Page 1 of 1
APPLICATION NO. : 14/512954
DATED             : March 21, 2017
INVENTOR(S)       : Kumar Srivastava It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 48 days.

Signed and Sealed this
Twenty-fifth Day of September, 2018

Andrei Iancu
*Director of the United States Patent and Trademark Office*